(12) United States Patent
Butler

(10) Patent No.: US 9,394,716 B2
(45) Date of Patent: Jul. 19, 2016

(54) UTILITY OR METER POLE TOP REINFORCEMENT METHOD AND APPARATUS

(71) Applicant: PLS Technologies, Inc., Palm Harbor, FL (US)

(72) Inventor: Robert P. Butler, Palm Harbor, FL (US)

(73) Assignee: PLS Technologies, Inc., Palm Harbor, FL (US)

( * ) Notice: Subject to any disclaimer, the term of this patent is extended or adjusted under 35 U.S.C. 154(b) by 0 days.

(21) Appl. No.: 14/737,779

(22) Filed: Jun. 12, 2015

(65) Prior Publication Data

US 2015/0275504 A1 Oct. 1, 2015

Related U.S. Application Data

(60) Continuation-in-part of application No. 14/624,845, filed on Dec. 18, 2015, which is a division of application No. 14/082,824, filed on Nov. 18, 2013, now Pat. No. 8,984,834.

(30) Foreign Application Priority Data

Nov. 14, 2014 (CA) .................................. 2870894

(51) Int. Cl.
*E04H 12/22* (2006.01)
*E04H 12/24* (2006.01)
*E04H 12/04* (2006.01)
*E04B 1/38* (2006.01)
*H02G 7/20* (2006.01)

(52) U.S. Cl.
CPC ............... *E04H 12/24* (2013.01); *E04H 12/04* (2013.01); *E04H 12/2292* (2013.01); *E04B 2001/405* (2013.01); *H02G 7/20* (2013.01)

(58) Field of Classification Search
CPC ..... E04B 1/40; E04B 2001/405; E04H 12/24; E04H 12/04; H01F 27/06; H01B 17/16; H02B 5/02; H02G 7/20
See application file for complete search history.

(56) References Cited

U.S. PATENT DOCUMENTS

| 868,591 | A | * | 10/1907 | Yaxley ............................ 52/697 |
| 1,420,430 | A | * | 6/1922 | Jaeckle et al. ................ 403/312 |
| 1,802,995 | A | * | 4/1931 | Williams ....................... 403/388 |
| 1,817,342 | A | * | 8/1931 | Beecher ........................... 52/170 |
| 2,265,452 | A | * | 12/1941 | Ruggieri .......................... 52/170 |
| 2,327,681 | A | * | 8/1943 | Vanderveer ..................... 52/835 |
| 2,392,222 | A | * | 1/1946 | Brickman ........................ 52/154 |
| 2,704,586 | A | * | 3/1955 | Kennedy ....................... 403/388 |
| RE24,133 | E | * | 3/1956 | Bloedow ....................... 403/403 |
| 2,884,670 | A | * | 5/1959 | Garrison et al. .............. 403/388 |
| 3,555,747 | A | * | 1/1971 | Taylor ............................... 52/40 |
| 3,568,968 | A | * | 3/1971 | Taylor ...................... H02G 7/20 211/107 |

(Continued)

*Primary Examiner* — Joshua J Michener
*Assistant Examiner* — Matthew Gitlin
(74) *Attorney, Agent, or Firm* — Nicholas Pfeifer; Smith & Hopen, P.A.

(57) ABSTRACT

An apparatus for reinforcing an upstanding utility/meter pole having a worn top includes an elongate brace adapted to bear against the pole near a top end of the pole. A washer plate is disposed in overlying relation to the elongate brace. A front support is secured to an opposite side of the pole by an elongate bolt that extends diametrically through the pole and is engaged by a nut to secure the brace and front support in sandwiching relation to the pole. A second embodiment reinforces a cross arm of a pole and a third embodiment ensleeves a pole at its uppermost end in a cylindrical body that serves as a prosthesis for a disintegrating pole top.

13 Claims, 11 Drawing Sheets

(56) References Cited

U.S. PATENT DOCUMENTS

| | | | | |
|---|---|---|---|---|
| 3,625,463 | A * | 12/1971 | Scholz | H02G 7/20 174/158 R |
| 3,856,250 | A * | 12/1974 | Farmer | H01F 27/06 211/107 |
| 3,921,949 | A * | 11/1975 | Coon | H02G 7/20 174/163 R |
| D243,926 | S * | 4/1977 | Dimiceli | D8/364 |
| 4,407,601 | A * | 10/1983 | Reeder | 403/25 |
| 4,575,904 | A * | 3/1986 | Drewes | E04H 12/20 24/115 K |
| 4,598,512 | A * | 7/1986 | Chapman | 52/165 |
| 4,697,396 | A * | 10/1987 | Knight | 52/170 |
| 4,932,623 | A * | 6/1990 | Reisdorff | H02G 7/20 248/219.3 |
| 5,228,260 | A * | 7/1993 | Dziedzic | 52/697 |
| 5,605,017 | A * | 2/1997 | Fingerson | E04C 3/28 174/153 R |
| 5,661,946 | A * | 9/1997 | Davis | E04H 12/04 248/219.2 |
| 5,799,918 | A * | 9/1998 | Swinderman | B65D 88/66 248/219.1 |
| 5,815,994 | A * | 10/1998 | Knight et al. | 52/170 |
| 6,079,165 | A * | 6/2000 | Bingel et al. | 52/170 |
| 6,595,477 | B2 * | 7/2003 | Roberts | H01B 17/16 174/138 R |
| 6,834,469 | B2 * | 12/2004 | Fingerson et al. | 52/651.02 |
| 7,278,247 | B2 * | 10/2007 | Baumgartner | 52/125.2 |
| 7,815,157 | B2 * | 10/2010 | Knight et al. | 248/219.4 |
| 8,122,652 | B2 * | 2/2012 | Knight et al. | 52/170 |
| 8,756,874 | B2 * | 6/2014 | Hurlebaus et al. | 52/73 |
| 2004/0084582 | A1 * | 5/2004 | Kralic | 248/219.3 |
| 2011/0083399 | A1 * | 4/2011 | Lettkeman et al. | 52/745.21 |
| 2014/0131525 | A1 * | 5/2014 | Lockhart et al. | 248/49 |

* cited by examiner

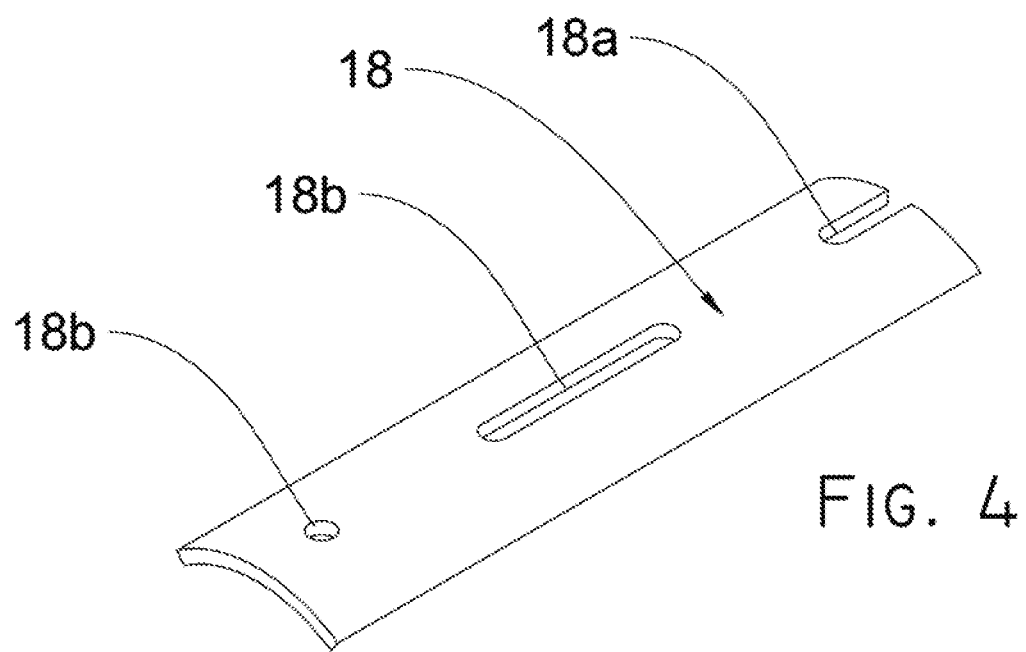

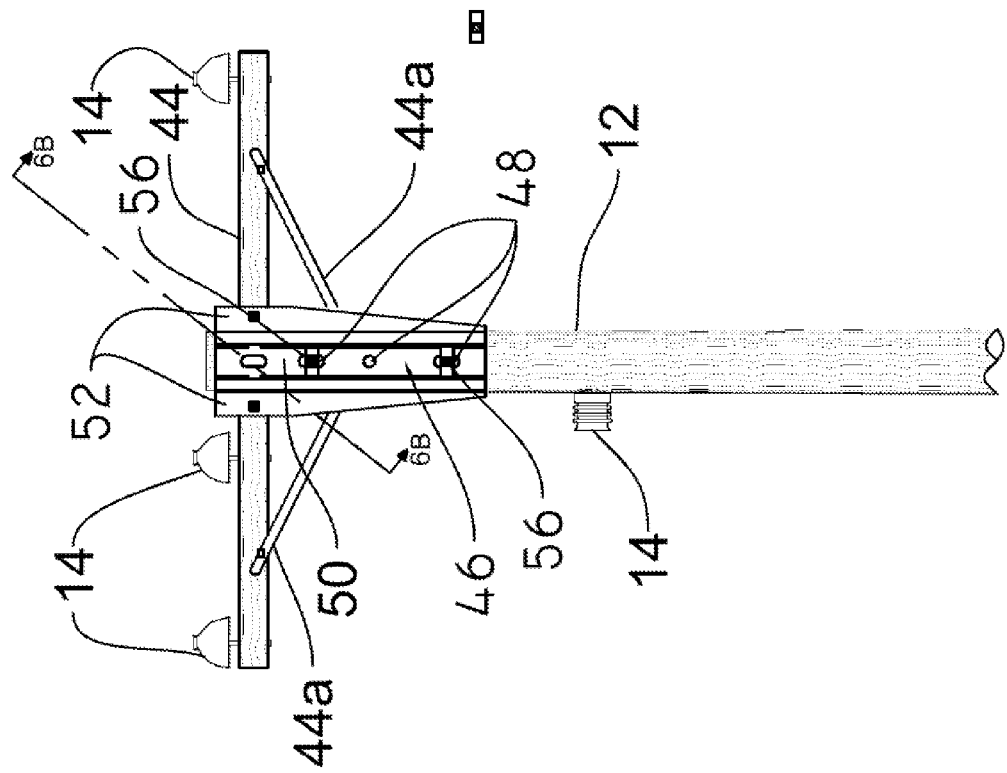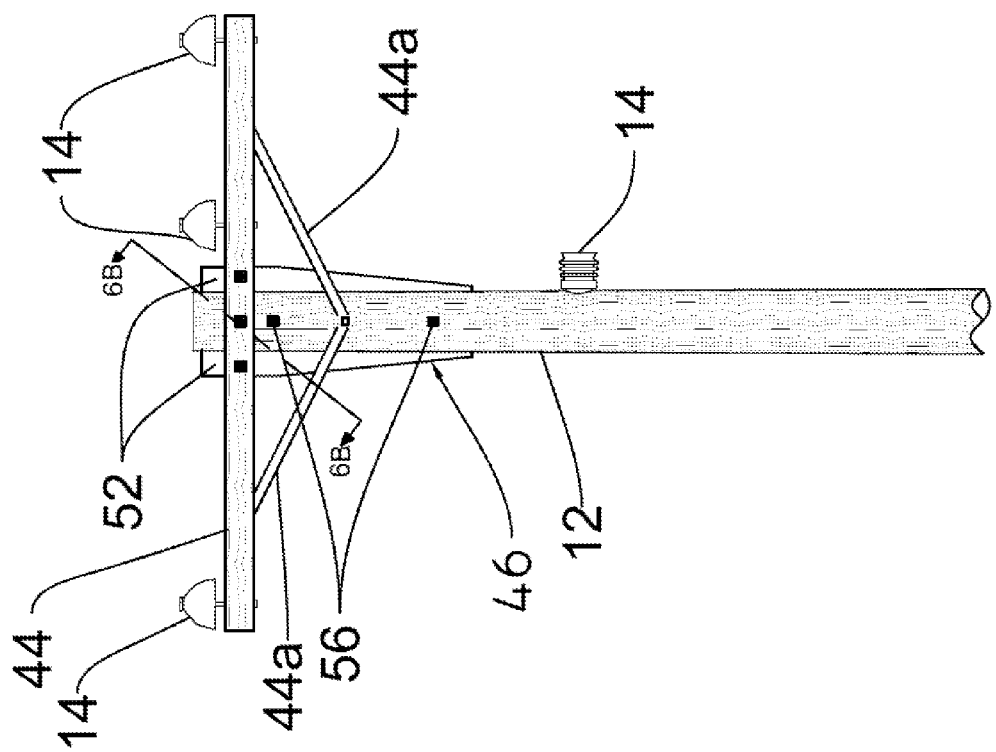

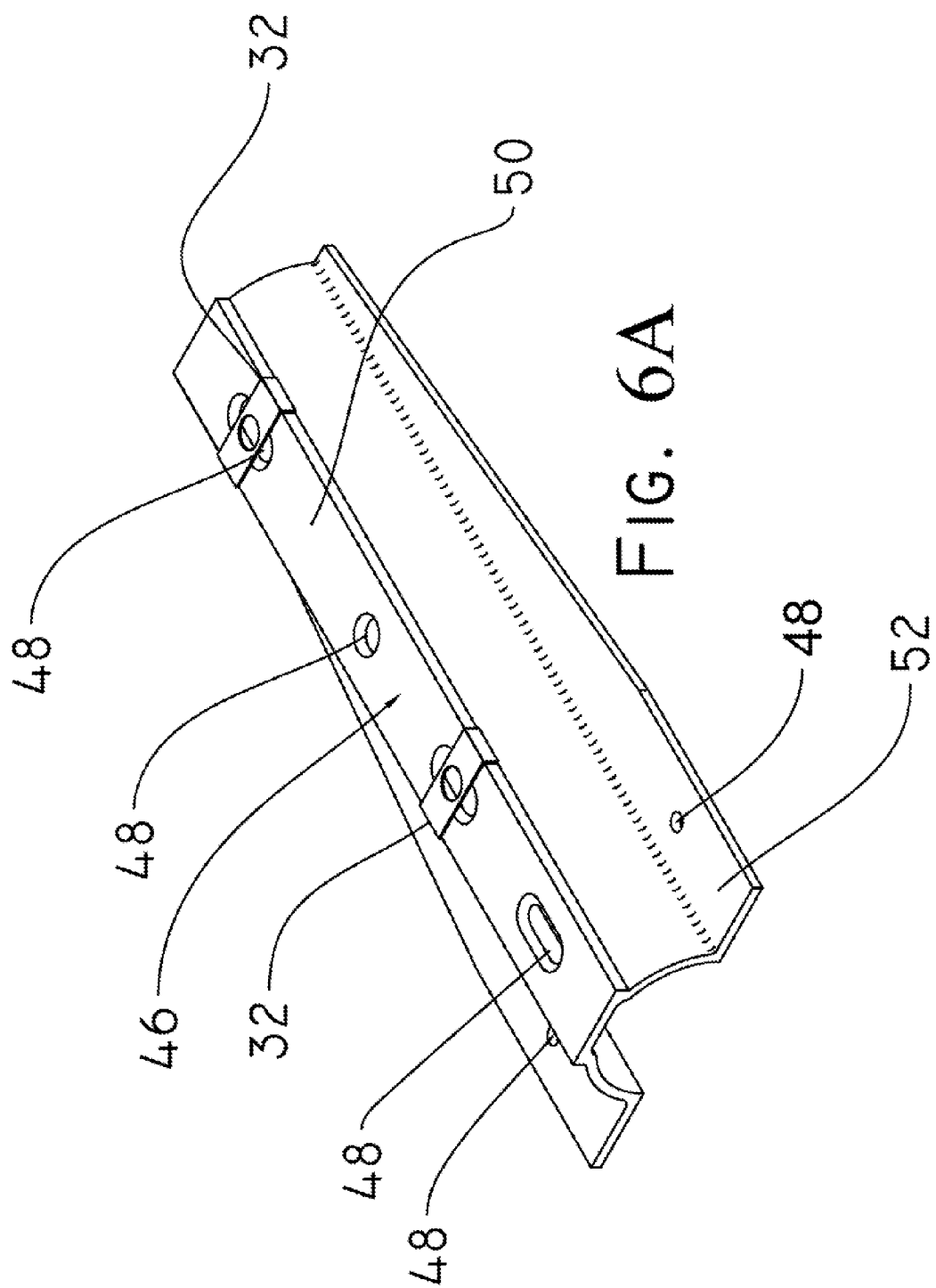

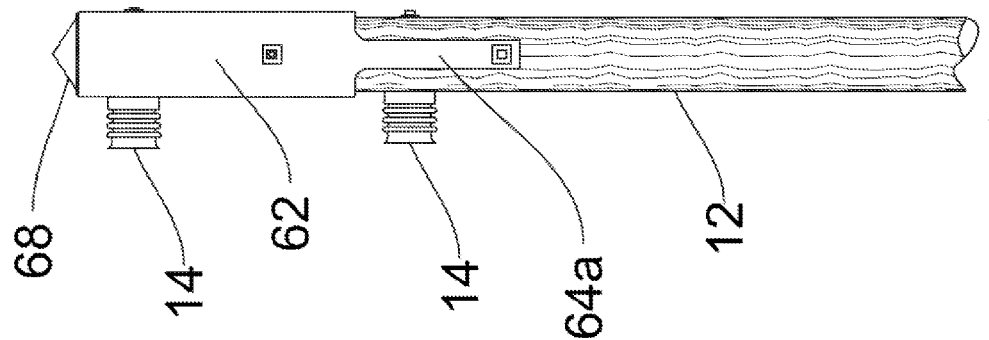
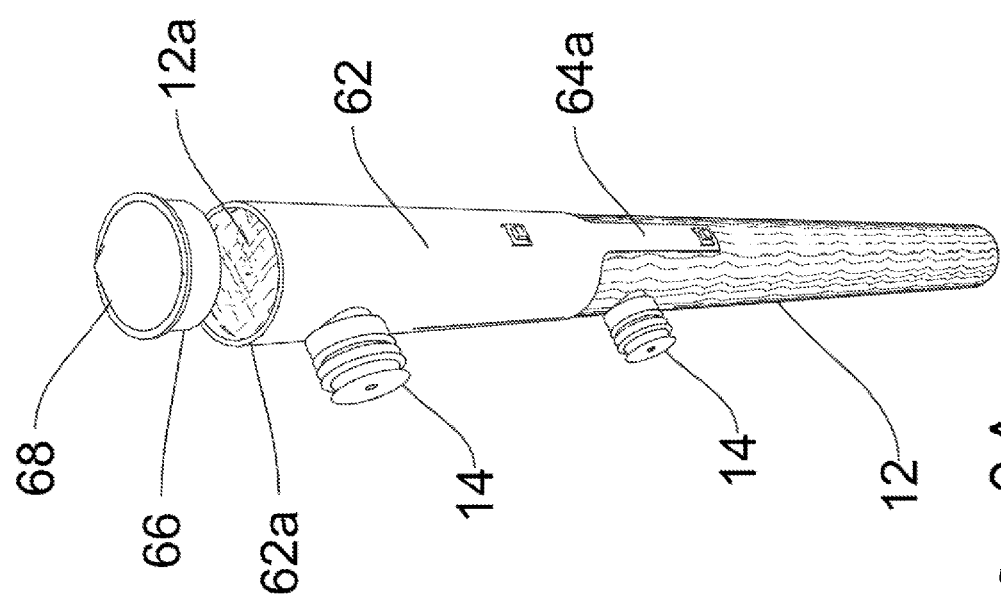

UTILITY OR METER POLE TOP REINFORCEMENT METHOD AND APPARATUS

CROSS-REFERENCE TO RELATED APPLICATIONS

This nonprovisional application is a continuation-in-part of and claims priority to nonprovisional application Ser. No. 14/624,845, entitled "UTILITY OR METER POLE TOP REINFORCEMENT METHOD AND APPARATUS," filed Feb. 18, 2015, which is a divisional and claim priority to nonprovisional application Ser. No. 14/082,824, entitled "UTILITY OR METER POLE TOP REINFORCEMENT METHOD AND APPARATUS," filed Nov. 18, 2013, by the same inventor.

BACKGROUND OF THE INVENTION

1. Field of the Invention

This invention relates, generally, to repair of upstanding poles such as utility poles. More particularly, it relates to methods and apparatuses for strengthening the tops of poles that have structurally deteriorated over time to avoid or delay the cost of replacing such poles.

2. Description of the Prior Art

Utility poles become degraded over time near the ground and also at their upper end. There are many patented devices for strengthening such poles at or near the ground so that they don't fall over but there has been little inventive activity for strengthening the upper end of such poles to which are connected dedicated voltage transmission/distribution lines as well as telephone/CATV lines.

Meter poles are smaller versions of utility poles; they are positioned near structures such as mobile homes where laws forbid the direct attachment of permanent lines. As used herein, the term "pole" refers to utility as well as meter poles or any other type of pole that may be in need of upper end reinforcement.

The current cost of replacing a utility pole that has lost its structural integrity is about three thousand dollars per pole. Every U.S. state has millions of such poles. There are between one hundred thirty to one hundred eighty million utility poles in use in North America and most utility companies replace about six thousand poles per year. The cost of course is passed along to the consumer.

The upper ends of many pressure-treated poles that were installed in the decade of the 1970s are now losing their structural integrity and are in need of replacement. The same will of course hold true in the future of poles installed in later decades as well. However, it would save companies and consumers substantial monies if those poles could be reinforced instead of replaced.

However, in view of the art considered as a whole at the time the present invention was made, it was not obvious to those of ordinary skill in the art how the upper ends of such poles could be reinforced at a cost substantially less than pole-replacement costs.

SUMMARY OF THE INVENTION

The long-standing but heretofore unfulfilled need for a device that reinforces deteriorating utility poles, meter poles, and the like is now met by a new, useful, and non-obvious invention.

The inventive structure is an apparatus for reinforcing an upstanding pole having an upper end that is worn, rotted, damaged, or otherwise in a deteriorated state.

The novel structure includes an elongate brace and at least two bolt-accommodating openings formed in the elongate brace. Each bolt-accommodating opening is centered on a longitudinal axis of symmetry of the elongate brace. The elongate brace is adapted to bear against the upstanding pole near the worn upper end of the upstanding pole.

At least two washer plates are disposed in overlying relation to the elongate brace and a bolt-accommodating opening is formed in each washer plate. The bolt-accommodating opening is centered on a longitudinal axis of symmetry of each washer plate and is aligned with a bolt-receiving opening formed in the elongate brace.

At least two elongate bolts are adapted to extend diametrically through the upstanding pole. Each elongate bolt extends through a preselected bolt-accommodating opening formed in the elongate brace and through the bolt-accommodating opening formed in the associated washer plate.

Each elongate bolt has a tool-engageable head and a free end that extends outwardly from the upstanding pole diametrically opposite from the tool-engageable head. A nut screw-threadedly engages the free end of each elongate bolt and advancement of the nut increasingly secures the associated washer plate to the elongate brace and therefore increasingly secures the elongate brace to the upstanding pole so that the upper end of the upstanding pole is reinforced by the elongate brace.

The elongate brace has a base and a pair of laterally spaced apart legs are formed integrally with the base. The legs are adapted to bear against the upstanding pole.

At least one cavity for accommodating a pre-existing, conventional washer is formed in the elongate brace in open communication with each bolt-accommodating opening. Each elongate bolt extends through the conventional washer-accommodating opening when the nut secures said washer plate to said elongate brace.

In a second embodiment, each washer plate has a recessed channel formed therein, centered on the longitudinal axis of symmetry of the washer plate. The recessed channel extends into an associated bolt-receiving opening and a spring lock is disposed in overlying relation to a bottom wall of the recessed channel. A nut screw-threadedly engages the free end of the elongate bolt in bearing relation to the spring lock so that advancing the nut increasingly urges the washer plate towards the elongate brace and therefore increasingly presses the elongate brace against the upper end of the upstanding pole.

In a third embodiment, each washer plate has a raised ridge formed therein, centered on the longitudinal axis of symmetry of the washer plate, said longitudinal axis of symmetry being coincident with the longitudinal axis of symmetry of the elongate brace.

In the third embodiment, a first spring lock is disposed in each bolt-accommodating opening formed in the elongate brace and a first nut is screw-threadedly engaged to the free end of the elongate bolt in bearing relation to the first spring lock. The elongate ridge is disposed in overlying relation to the first nut and a second spring lock is disposed in overlying relation to the elongate ridge. A second nut screw-threadedly engages the free end of the elongate bolt in bearing engagement to the second spring lock so that advancement of the first and second nuts enables each washer plate to bear increasingly against the elongate brace and thus cause the elongate brace to bear increasingly against the upper end of the pole, thereby reinforcing it.

All three embodiments include an elongate front support member that is arcuate in transverse section to conform to the surface of the pole and which is mounted on the upper end of the pole in diametric relation to the elongate brace so that the damaged upper end of the upstanding pole is sandwiched between the front support member and the elongate brace.

At least two openings are formed in the front support member to accommodate the elongate bolts that secure the front support member to the upstanding pole. The elongate bolt that extends through the elongate brace and washer plate is the same elongate bolt that extends through the preselected opening formed in the front support member, i.e., the elongate bolts secure the front support member to a first side of the pole and secure the elongate brace to a second, diametrically opposed side of the pole so that the upper end of the pole is sandwiched between the front support member and the elongate brace.

A fourth embodiment of the invention is an apparatus for supporting a horizontally disposed cross arm mounted to an upstanding pole. It includes a vertical cross arm support member adapted to be secured to both the pole and the existing cross arm of the pole to provide pole attachment strength and stability.

An elongate brace is adapted to abut the pole in diametrically opposed relation to the cross arm support member. An aperture is formed in the elongate brace and aligned with an aperture formed in the elongate base support of the cross arm support member to receive a bolt that extends diametrically through the pole to secure the vertical cross arm support member to the pole.

In an embodiment, the vertical cross arm support member comprises an elongate base support with two flanges extending outward in opposite direction from the longitudinal axis of the vertical cross arm support member. The flanges are intended to extend parallel with the existing cross arm on the pole. Each flange includes one or more apertures adapted to receive a bolt extending diametrically through the existing cross arm on the pole. The attachment of the flanges to the existing cross arm prevents rotation of the existing cross arm in a horizontal plane about a longitudinal axis of the pole. Additionally, the elongate structure in conjunction with the flanges prevents rotation in a vertical plane.

A fifth embodiment of the invention is a prosthetic apparatus for reinforcing a deteriorating top of an upstanding pole. It includes a cylindrical main body having an upper rim at a first end of the main body. A pair of legs depend from a second end of the main body in diametrically opposed relation to one another.

A plurality of apertures is formed in the cylindrical main body in circumferentially and longitudinally spaced relation to one another to facilitate attachment of the cylindrical main body and the legs to the pole.

The upper rim projects above an uppermost end of the upstanding pole when the uppermost end is ensleeved by the cylindrical main body.

A top cap has a skirt having a length substantially equal to a distance of the upper rim above the uppermost end of the upstanding pole so that the skirt fits within the hollow interior of the cylindrical main body when the top cap engages the cylindrical main body.

A general object of this invention is to lengthen the lifetime of upstanding poles such as a utility poles owned by a public or private utility company or meter poles of the type used in connection with mobile homes.

A more specific object is to reinforce the upper end of such poles at a cost that is much less than the cost of replacing such a pole.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which:

FIG. 4 is a perspective view of the elongate front support that is common to the first three embodiments;

FIG. 5A is a front elevational view of the fourth embodiment;

FIG. 5B is a rear elevational view of the fourth embodiment;

FIG. 6A is a perspective view of a certain embodiment of the vertical cross arm support member;

FIG. 8A is a partially exploded perspective view of the fifth embodiment when installed on a pole; and FIG. 8B is a perspective view of the fifth embodiment when installed on a pole.

DETAILED DESCRIPTION OF THE PREFERRED EMBODIMENT

Figure 1A:
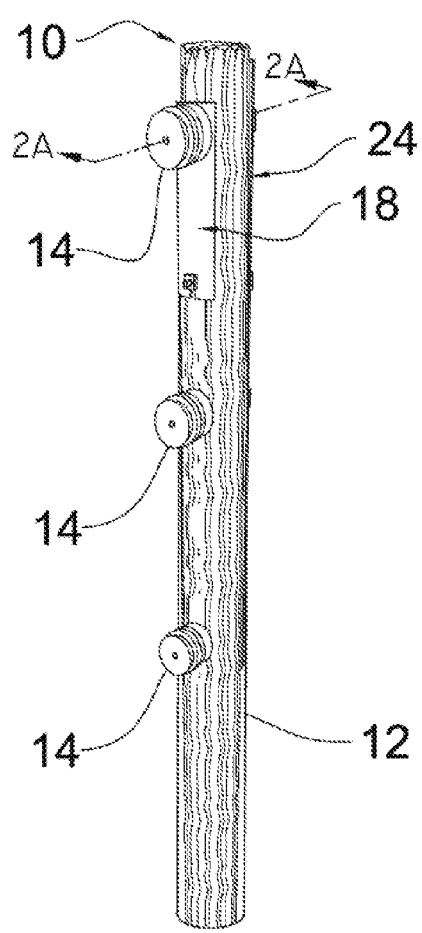
FIG. 1A is a front perspective view of a first embodiment.
Figure 1B:
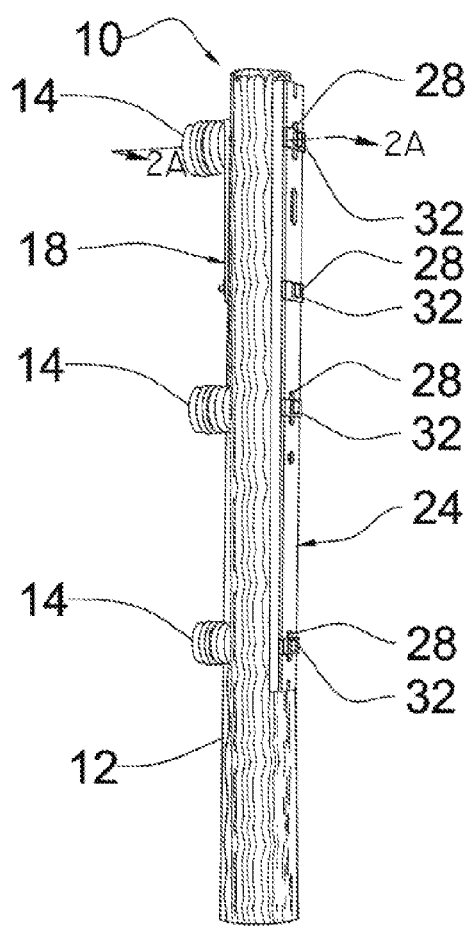
FIG. 1B is a rear perspective view of the first embodiment.

FIGS. 1A and 1B depict a first illustrative embodiment of the novel structure, denoted 10 as a whole, when installed on a utility or meter pole 12 having at least one insulator 14 secured thereto. The structure is perhaps more fully disclosed in FIG. 2.

Figure 2A:
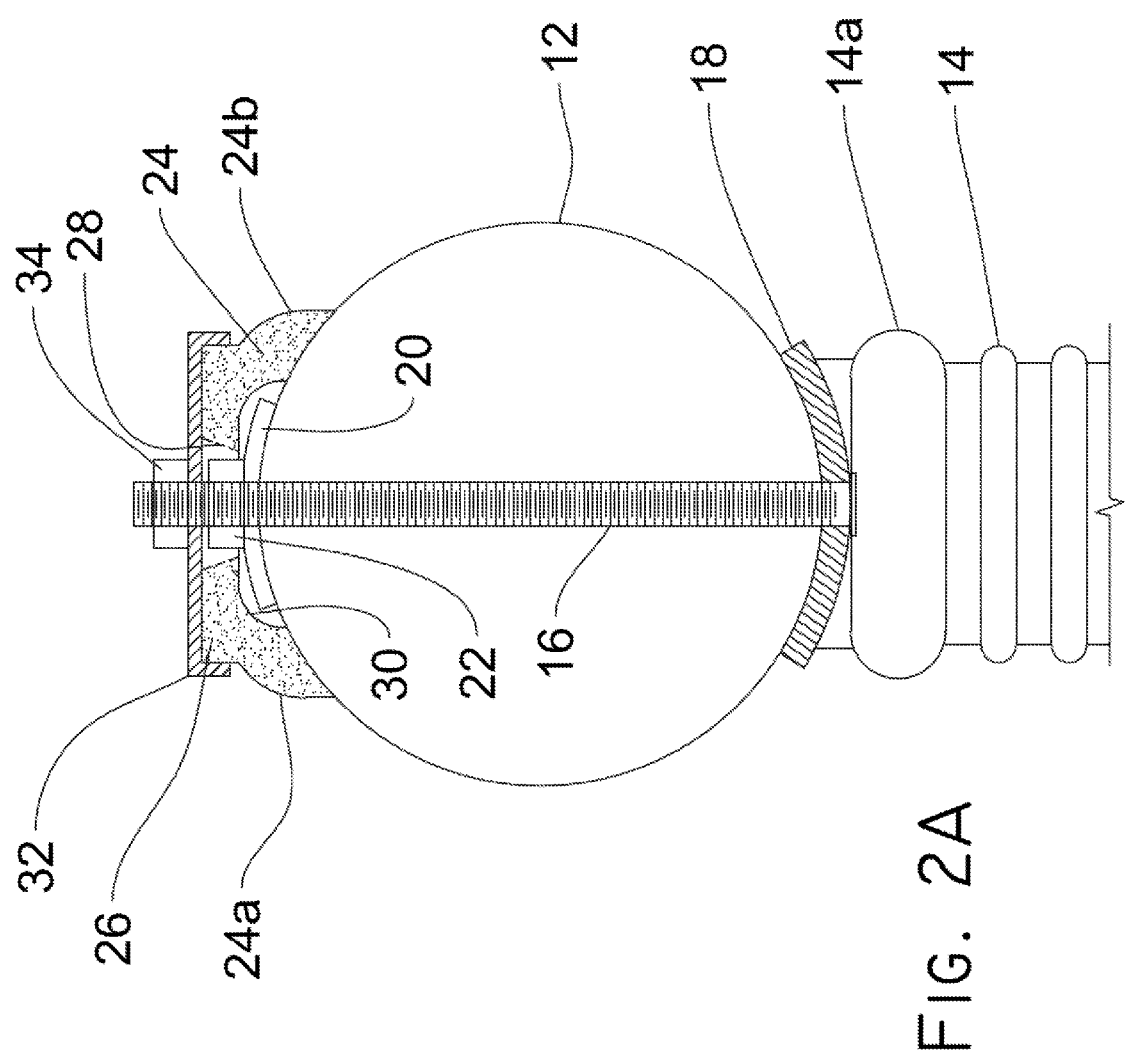
FIG. 2A is a sectional view taken along line 2A-2A in FIGS. 1A and 1B.

In FIG. 2A, conventional insulator 14 having base 14a is secured to pole 12 near the uppermost end thereof by elongate bolt 16. Front support 18 conforms to the shape of pole 12 and its upper end provides support for insulator base 14a. Front support 18 has an elongate vertical extent as depicted in FIGS. 1A and 1B.

Conventional, pre-existing washer 20 near the top of FIG. 2A has an arcuate shape to conform to the shape of pole 12 and is held against the pole by conventional, pre-existing nut 22. Said washer and nut are diametrically opposed to conventional, pre-existing insulator base 14a.

The novel structure includes elongate brace 24 having laterally spaced apart legs 24a, 24b that bear against the top of pole 12 in diametrically opposed relation to elongate front plate 18 as depicted. Legs 24a, 24b are formed integrally with base 26 of elongate brace 24. At least two bolt-accommodating openings 28 are formed in said base 26, said openings being centered on a longitudinal axis of symmetry of said elongate brace. Each opening 28 is in open communication with an associated washer-accommodating opening 30. A plurality of openings 28 is formed along the vertical extent of elongate brace 24 as indicated in FIG. 1B. Each opening 28 may be provided as a circular opening or as an elongate slot as indicated in said FIG. 1B and as indicated in FIG. 3 as well.

Reinforcing base 26 is square at its outer or outboard surface, i.e., the surface that does not contact pole 12. Washer plate 32 conforms to that square configuration and overlies said outer surface as depicted. Nut 34 screw-threadedly engages bolt 16 and secures washer plate 32 and hence brace 24 to the top of the pole in diametric opposition to insulator 14 and elongate front support 18. Each washer plate 32 thus performs the function of a washer.

Figure 3:
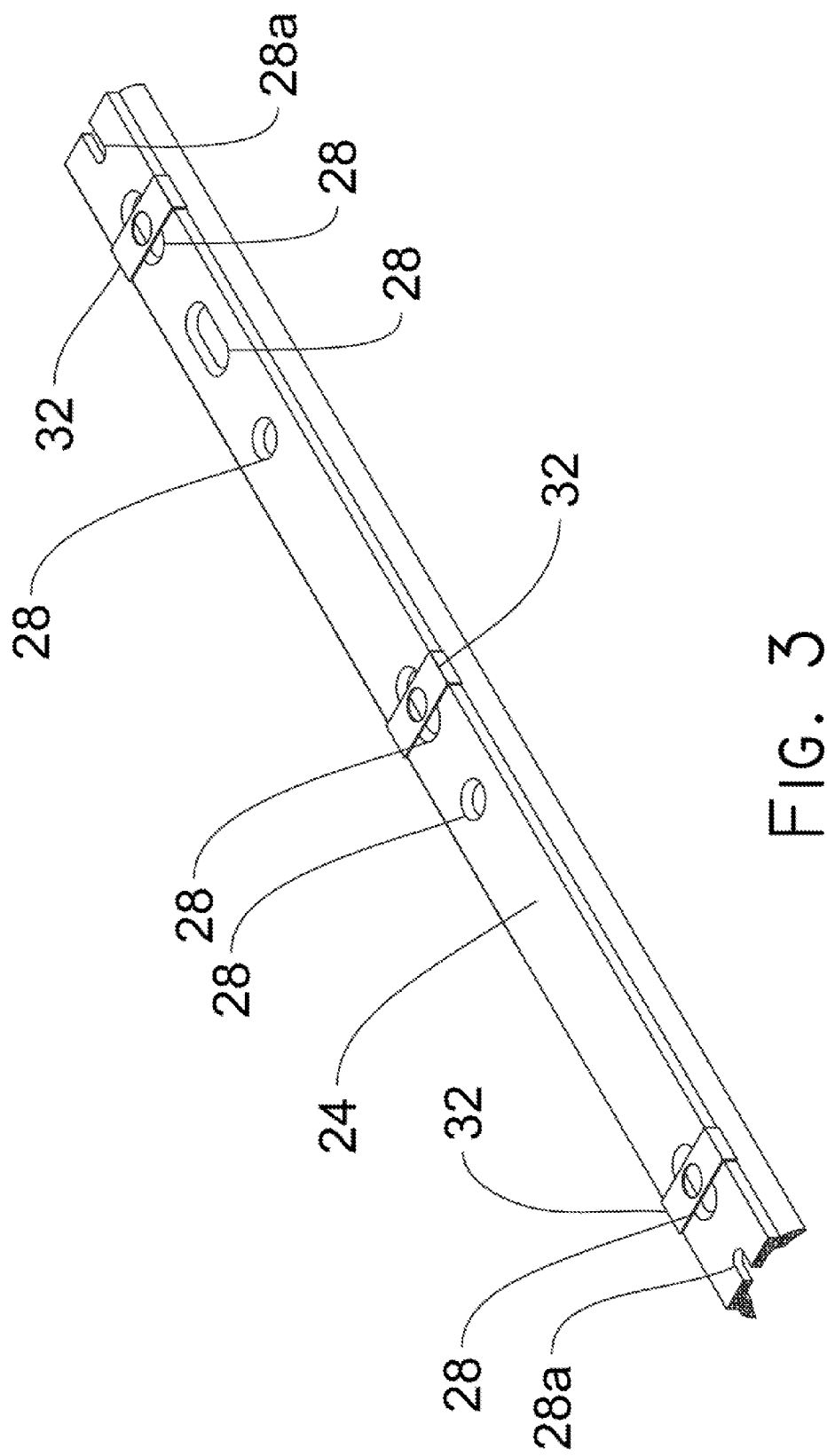
FIG. 3 is a perspective view of the back support brace of the first, second, and third embodiments.

Said elongate brace 24 and washer plates 32 are depicted in perspective view in FIGS. 1A and 3. Openings 28 are provided in plural locations in both circular and slotted form to accommodate various pole structures. Open slots 28a at the opposite ends of elongate brace 24 are used to accommodate pre-existing bolts as needed.

It will be observed in the embodiment of FIG. 2A that each nut 34 is provided at the time of pole repair, i.e., conventional nut 22 remains in its original position.

Novel front support 18, depicted in FIGS. 1A, 1B, and 4 has an elongate structure. It has a first end that underlies insulator 14 and a second end that is longitudinally spaced apart from the first end and which therefore does not underlie the insulator.

Front support 18 is arcuate in transverse section and its upper end is slotted as at 18a to accommodate elongate bolt 16 which is not depicted in FIG. 4. Circular or slotted openings 18b are formed therein as depicted to accommodate bolts as needed for fastening front support 18 to the front or insulator side of pole 12.

Front support 18 and elongate brace 24, which provides back support, are disposed in diametrically opposed relation to one another and hold pole 12 in sandwiched relation between them.

Figure 2B:
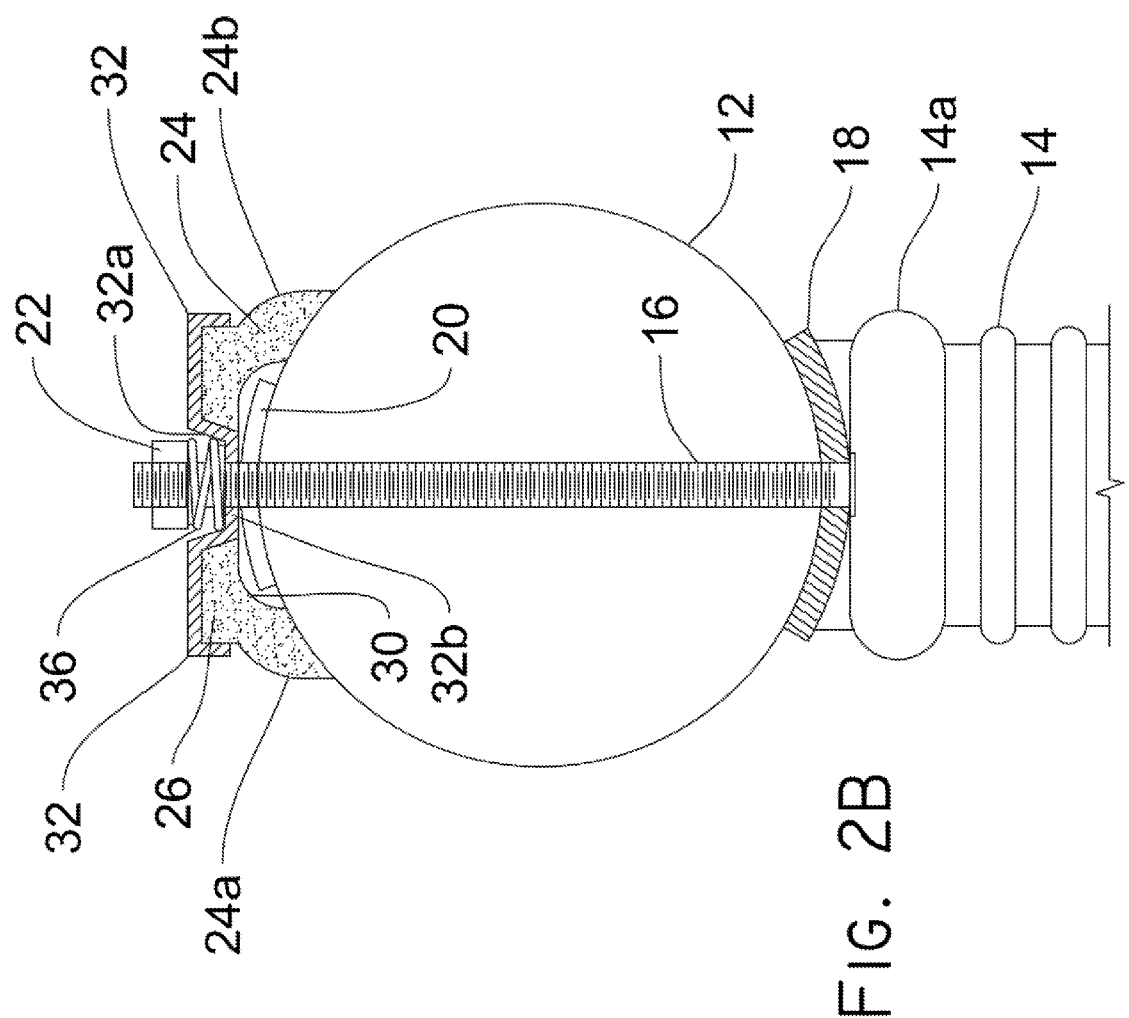
FIG. 2B is a view similar to the sectional view of FIG. 2A but depicts a second embodiment.

FIG. 2B depicts a second embodiment where conventional nut 22 is removed from bolt 16 and then re-engaged thereto. In this second embodiment, each washer plate 32 has a recessed channel 32a formed in the center thereof as depicted. Channel 32a includes centrally-apertured bottom wall 32b and said bottom wall is substantially flush with washer-accommodating opening 30. Bottom wall 32b thus performs the function of a washer and reinforces conventional washer 20.

Each spring lock 36 fits within channel 32a and abuts channel bottom plate 32b Conventional nut 22 is returned to its screw-threaded engagement with bolt 16 to bear against spring lock 36. This second embodiment has the advantage of not requiring second nut 34 of the first embodiment.

Figure 2C:
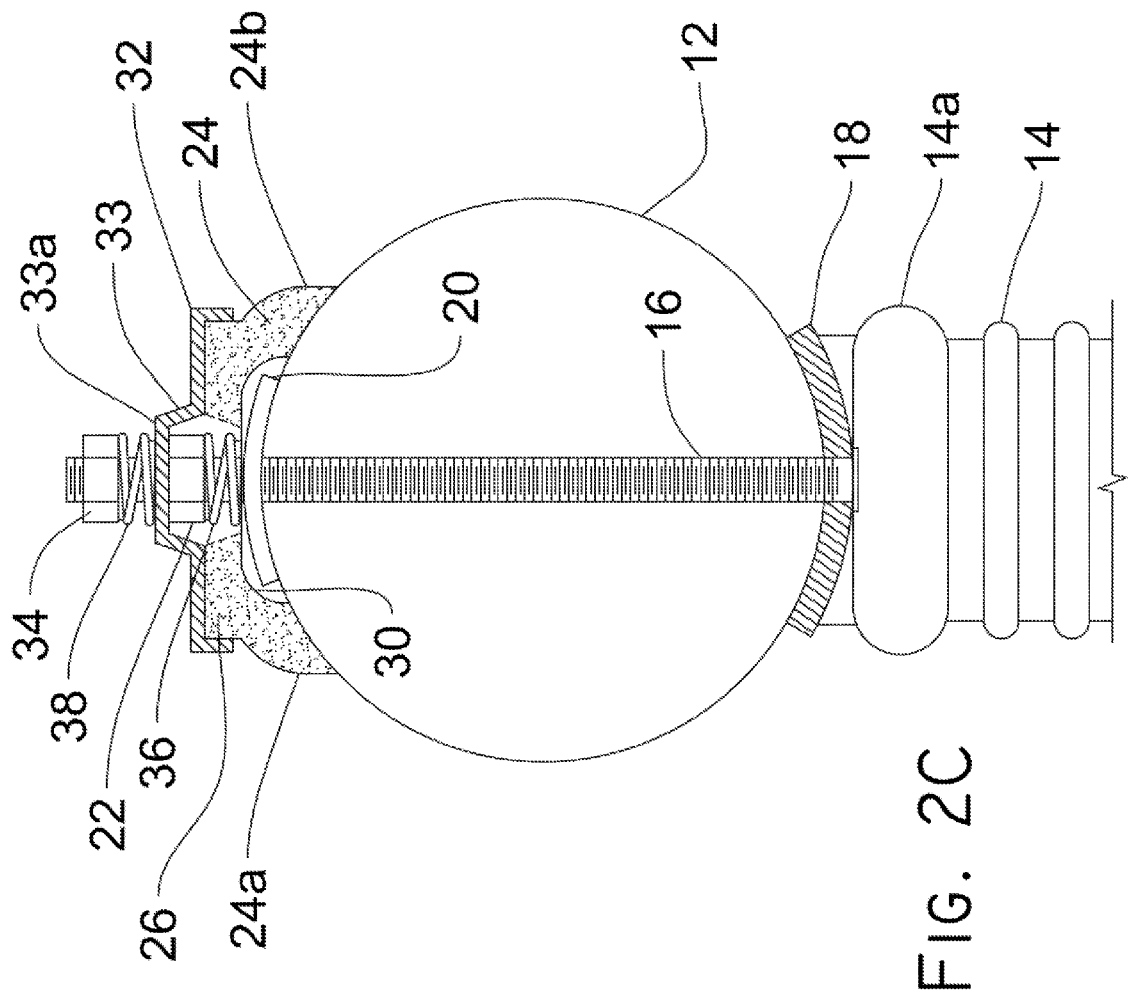
FIG. 2C is a view similar to the sectional view of FIG. 2A but depicts a third embodiment.

FIG. 2C depicts a third embodiment where conventional nut 22 remains as in the first embodiment in screw-threaded engagement with bolt 16, and where additional nut 34 of the first embodiment is also used.

In this third embodiment, each washer plate 32 has a raised ridge 33 that includes centrally-apertured top wall 33a as depicted in FIG. 2C. Conventional nut 22 and spring lock 36 are disposed in bearing relation to conventional washer 20. Each washer plate 32 is then placed into overlying relation to base 26 of elongate brace 24 in registration with each opening 28 as needed. A second spring lock 38 is placed into overlying relation to each top wall 33a and is secured thereto by a nut 34.

Figure 6B:
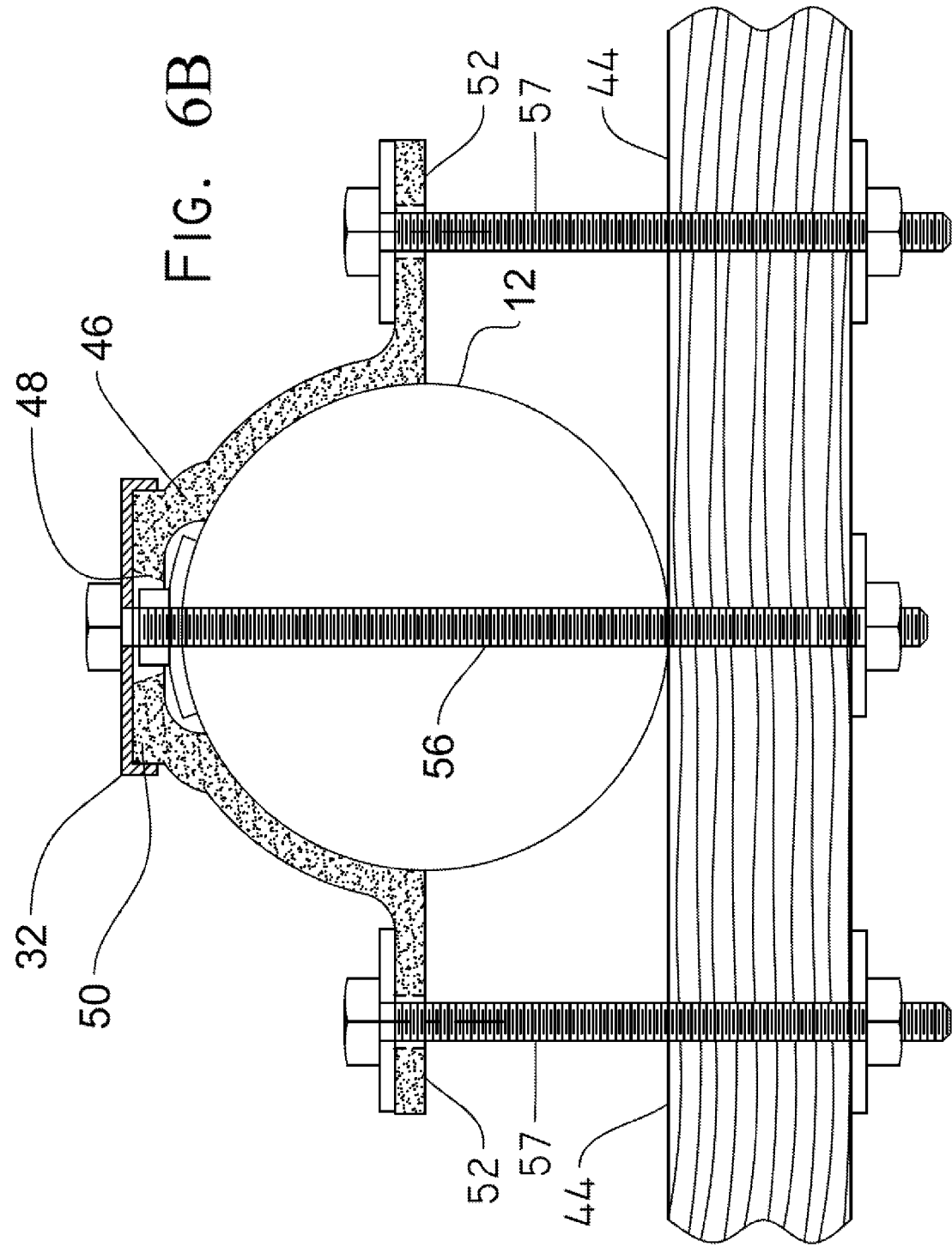
FIG. 6B is a sectional view taken along line 6B-6B in FIGS. 5A and 5B.

A fourth embodiment is depicted in FIGS. 5A, 5B, 6A, and 6B. This embodiment has utility in connection with upstanding poles 12 having a cross arm 44, with or without braces 44a. The perspective view of FIG. 6A depicts a certain embodiment of cross arm support member 46. Apertures 48 are formed in elongate support base 50 and may take the form of a circular opening or an elongated slot as depicted. A ninety degree bend forms vertical flange 52 enabling attachment of vertical cross arm support member 46 to cross arm 44 as depicted in FIGS. 5A and 5B. As illustrated in FIG. 6B, through bolts 57 pass through apertures 48 on flanges 52 into cross arm 44 to secure vertical cross arm support member 46 to cross arm 44.

As depicted in FIG. 5A, bolt 56 is inserted into pole 12 through aperture 48 to secure cross arm support member 46 to said pole. Cross arm support member 46 is positioned on pole 12 so that flange 52 serves as a support surface for cross arm 44 at generally the mid-length region of said cross arm. Flanges 52 provide support for cross arm 44 and inhibits rotation of said cross arm in a vertical and horizontal plane.

As depicted in FIG. 5B, bolts 56, which secure cross arm support member 46 to pole 12 preferably extend diametrically through the pole and when used with suitable nuts and washers secure cross arm support member 46 to pole 12. Further bolts may be used to further secure said cross arm support member 46 to pole 12, said cross arm support member 46 being provided with multiple apertures along its extent and slots at its opposite ends for that purpose. A certain embodiment may include an elongate brace, similar to elongate brace 24 shown in FIG. 3, diametrically opposed from cross arm support member 46 to sandwich pole 12. The sandwiching of pole 12 between cross arm support member 46 and the elongate brace provides additional support for flanges 52.

Figure 7:
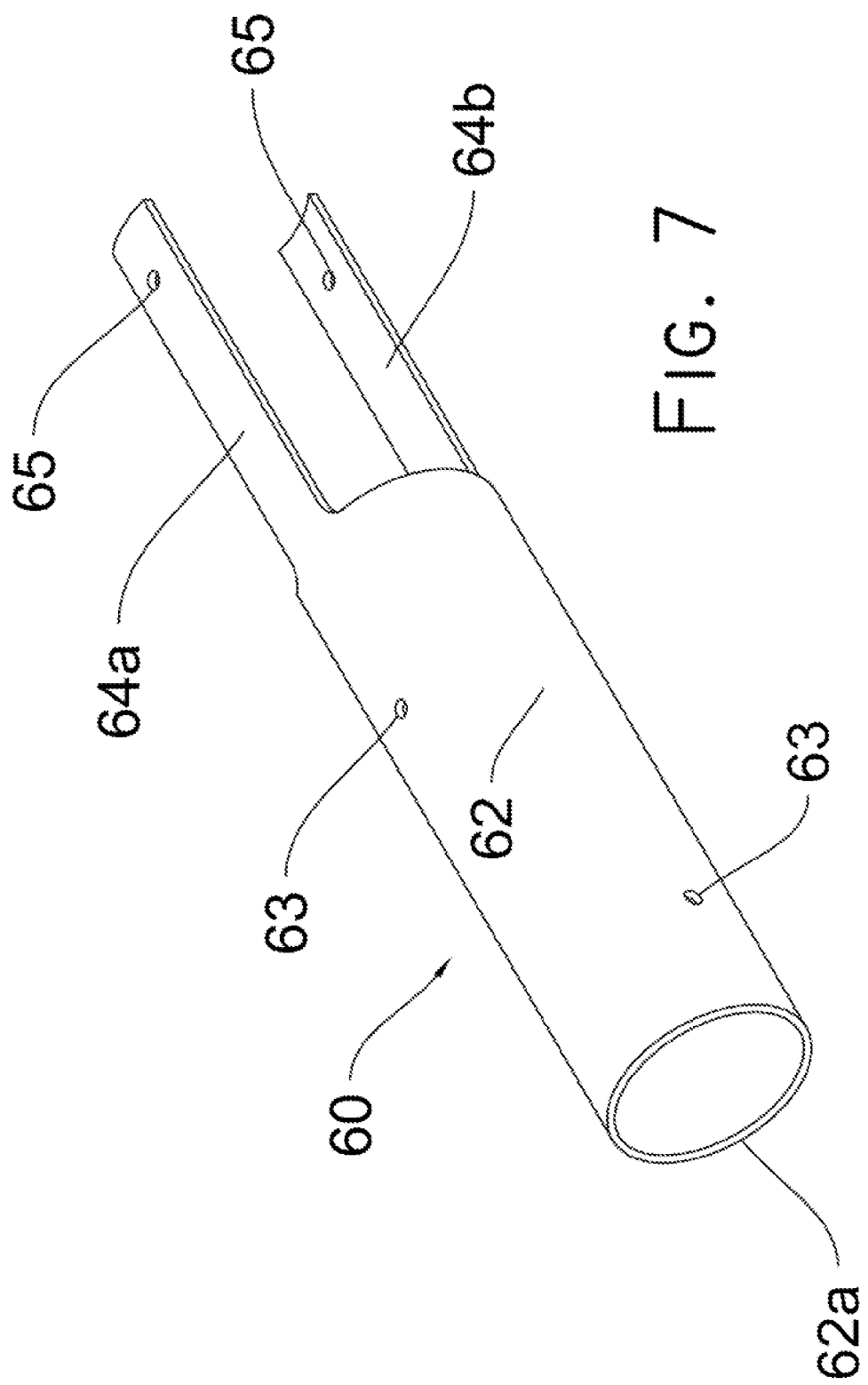
FIG. 7 is a perspective view of the cylindrical prosthesis of the fifth embodiment.

A fifth embodiment is depicted in FIGS. 7, 8A and 8B. Main body 62 of brace 60 is cylindrical. Legs 64a, 64b depend from cylindrical main body 62 in diametrically opposed relation to one another. The upper rim of main body 62 is denoted 62a. Apertures collectively denoted 63 are formed in cylindrical main body 62 in circumferentially and longitudinally spaced relation to one another and apertures collectively denoted 65 are formed in legs 64a, 64b.

As depicted in FIG. 8A, upper rim 62a of cylindrical main body 62 projects above the uppermost end 12a of pole 12 when brace 60 is properly installed in ensleeving relation to a pole top. Skirt 66 of top cap 68 has a length equal to or just slightly less than the distance of rim 62a above pole top 12A so that said skirt fits within the hollow interior of cylindrical main body 62 when top cap 68 is in its functional position as depicted in FIG. 8B. The diameter of skirt 66 causes it to fit tightly with a good friction fit within said hollow interior so that high winds cannot cause it to separate from said functional position. Various bolts or screws extend through apertures 63 and 65 to secure brace 60 to pole 12.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An apparatus for supporting a horizontally disposed cross arm mounted to an upstanding utility pole, comprising:
   an elongate base support mounted and secured proximate an upper end of said upstanding utility pole, wherein said elongate base support has a semi-circular cross-sectional shape extending between a first end and a second end of said semi-circular cross-sectional shape;
    a pair of planar flanges, wherein a first flange is integrated into said elongate base support at said first end of said semi-circular cross-sectional shape of said base support and extends outward therefrom, and a second flange is integrated into said elongate base support at said second end of said semi-circular cross-sectional shape of said base support and extends outward therefrom;
    each flange extending in an outwardly direction with respect to a longitudinal axis of said elongate base support on opposite sides of said elongate base structure in a lateral direction and in the same plane as one another;
    said elongate base support having an aperture;
    said pair of flanges each having an aperture, whereby said aperture in each flange is near an upper end of said apparatus and adapted to align with said cross arm mounted to said upstanding utility pole,
    a flat elongate ridge extending outwardly from a mid-point of said semi-circular cross-sectional shape of said elongate base support; and
    a washer plate mounted to and spanning a distance equivalent to a width of said flat elongate ridge, said washer plate further including a bolt-accommodating aperture.

2. The apparatus of claim 1, further comprising said elongate base support secured to said upstanding utility pole through a bolt extending diametrically through said pole and said aperture in said elongate base structure.

3. The apparatus of claim 2, further comprising an elongate brace having an aperture and a longitudinal axis extending in a same direction as said longitudinal axis of said elongate support base, said elongate brace abutting said pole in diametrically opposed relation to said elongate base support, such that said bolt extending diametrically through said pole is received by said aperture in said elongate brace as well as said aperture in said elongate base support.

4. The apparatus of claim 1, wherein said elongate base support further includes a semi-circular cross-section to allow said elongate base support to mate with a curvature of said pole.

5. The apparatus of claim 1, wherein said pair of flanges each taper towards said longitudinal axis of said elongate base support from said apertures of said flanges to a bottom end of said elongate base support.

6. The apparatus of claim 1, wherein said elongate base support is disposed on said upstanding utility pole in a diametrically opposed relation to said cross arm of said upstanding utility pole.

7. The apparatus of claim 1, wherein said elongate base support further includes:
    wherein said flat elongate ridge extends outwardly such that a channel is formed on an internal lateral surface of said elongate base support; and
    said washer plate includes perpendicularly disposed engagement legs thereby providing guides to maintain the location of said washer plate along said flat elongate ridge.

8. An apparatus for supporting a horizontally disposed cross arm mounted to an upstanding utility pole, comprising:
    an elongate base support secured to an upper end of said upstanding utility pole, wherein said elongate base support has a semi-circular cross-sectional shape extending between a first end and a second end of said semi-circular cross-sectional shape;
    a pair of flanges, wherein each flange extends outward from a longitudinal axis of said elongate base support on opposite side of said elongate base structure in a lateral direction and in the same plane as one another;
    said elongate base support having an aperture; and
    said pair of flanges each having an aperture, whereby said aperture in each flange is secured to said cross arm mounted to said upstanding utility pole;
    a flat elongate ridge extending outwardly from a mid-point of said semi-circular cross-sectional shape of said elongate base support; and
    a washer plate mounted to and spanning a distance equivalent to a width of said flat elongate ridge, said washer plate further including a bolt-accommodating aperture.

9. The apparatus of claim 8, further comprising said elongate base support secured to said upstanding utility pole through a bolt extending diametrically through said pole and said aperture in said elongate base structure.

10. The apparatus of claim 9, further comprising an elongate brace having an aperture and abutted to said pole in diametrically opposed relation to said elongate base support, such that said bolt extending diametrically through said pole is received by said aperture in said elongate brace as well as said aperture in said elongate base support.

11. The apparatus of claim 8, wherein said elongate base support further includes a semi-circular cross-section that mates with a curvature of said pole.

12. The apparatus of claim 8, wherein said pair of flanges each taper towards said longitudinal axis of said elongate base support from said apertures of said flanges to a bottom end of said elongate base support.

13. The apparatus of claim 8, wherein said elongate base support is disposed on said upstanding utility pole in a diametrically opposed relation to said cross arm of said upstanding utility pole.

\* \* \* \* \*